March 18, 1930. G. H. HALL 1,750,887
ROTARY TILLER ATTACHMENT FOR DISK PLOWS
Filed April 3, 1928 3 Sheets-Sheet 1
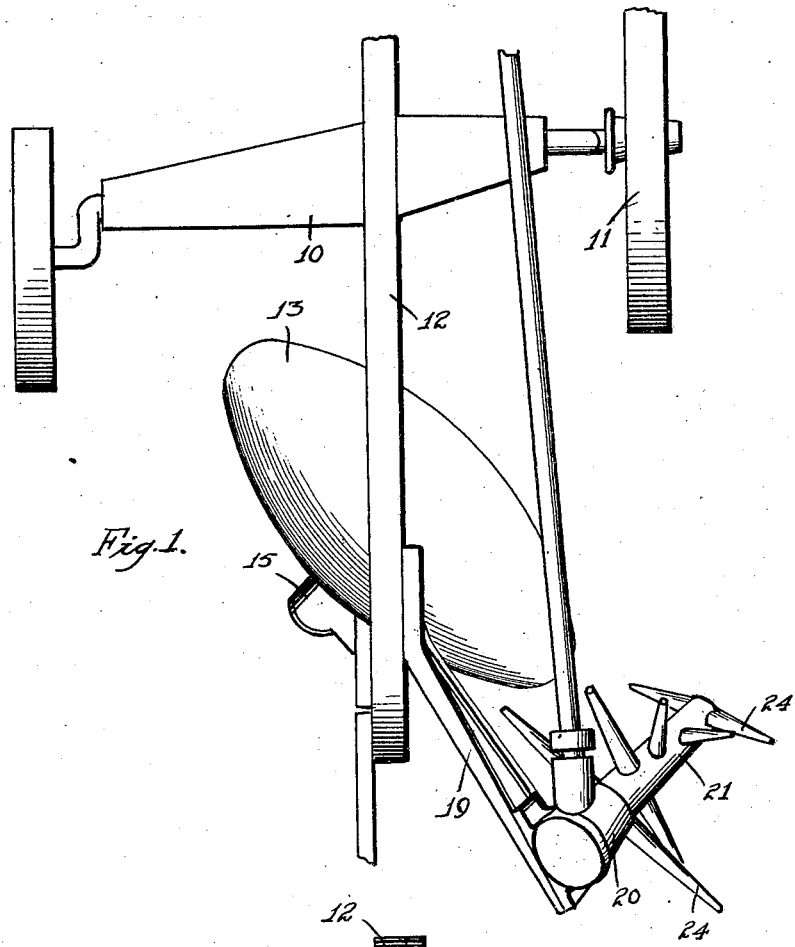
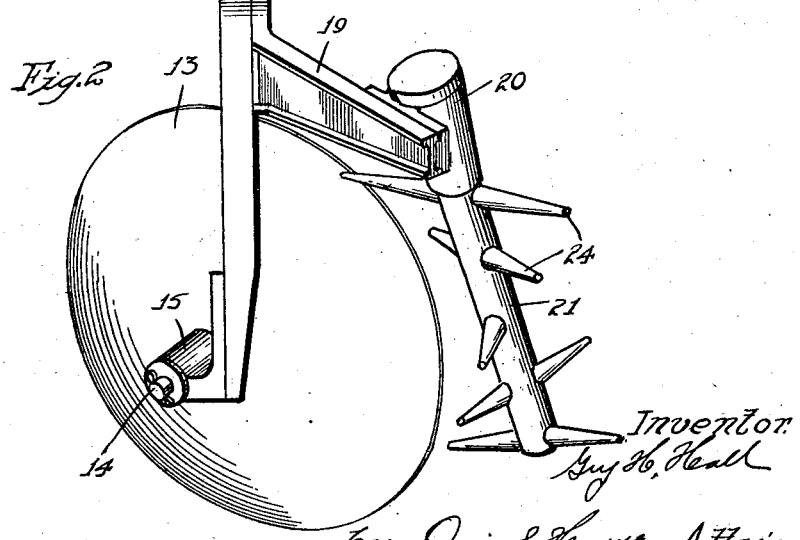

March 18, 1930.  G. H. HALL  1,750,887
ROTARY TILLER ATTACHMENT FOR DISK PLOWS
Filed April 3, 1928   3 Sheets-Sheet 2

Inventor
Guy H. Hall
by Owing & Hague Att'ys.

March 18, 1930. G. H. HALL 1,750,887
ROTARY TILLER ATTACHMENT FOR DISK PLOWS
Filed April 3, 1928 3 Sheets-Sheet 3

Inventor
Guy H. Hall
by Owing & Hager Atty's.

Patented Mar. 18, 1930

1,750,887

UNITED STATES PATENT OFFICE

GUY HERRING HALL, OF EVANSTON, ILLINOIS

ROTARY TILLER ATTACHMENT FOR DISK PLOWS

Application filed April 3, 1928. Serial No. 266,929.

My invention relates to that class of disk plows which are now in common use, and which are supported on wheels. In disk plows of this character, as is well known, the disk itself is of such curvature and is presented to its work at such an angle that it will, when being advanced, cut out from the soil a furrow slice and cause this furrow slice to move relative to the disk rearwardly and laterally and across the face of the disk, and at the same time it will impart to the furrow slice the initial part only of the necessary turning-over movement, to the extent that if no means were provided for completing the initial turning-over movement of the furrow slice, the "trash" on the surface of the soil would not be buried. Disk plows of this character are usually provided with a stationary mould board, the function of which is to engage the furrow slice and complete its turning-over movement that was initiated by the disk.

The object of my invention is to provide a rotary tiller device in the nature of an attachment which may be readily, quickly and easily applied to a disk plow beam and operated by power from a tractor or the like, and which when in use will co-operate with the disk, receive the furrow slice from the disk, complete the turning-over movement of the furrow slice, and at the same time thoroughly pulverize it and form an ideal seed bed.

A further object is to provide a rotary tiller of this character which, when combined with a disk plow, may be advanced by a tractor and the rotary tiller operated by power from the tractor with a minimum of applied power, to the extent that a tractor capable of advancing an ordinary disk plow with its mould board for completing the turning-over movement of the furrow slice will operate my improved device at the same speed and to cut the same size or number of furrow slices.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a portion of a sulky plow frame and a disk plow carried thereby, and my improved rotary tiller device attached to the plow beam and fixed in proper position relative to the disk.

Figure 2 shows a rear elevation of same.

Figure 4:
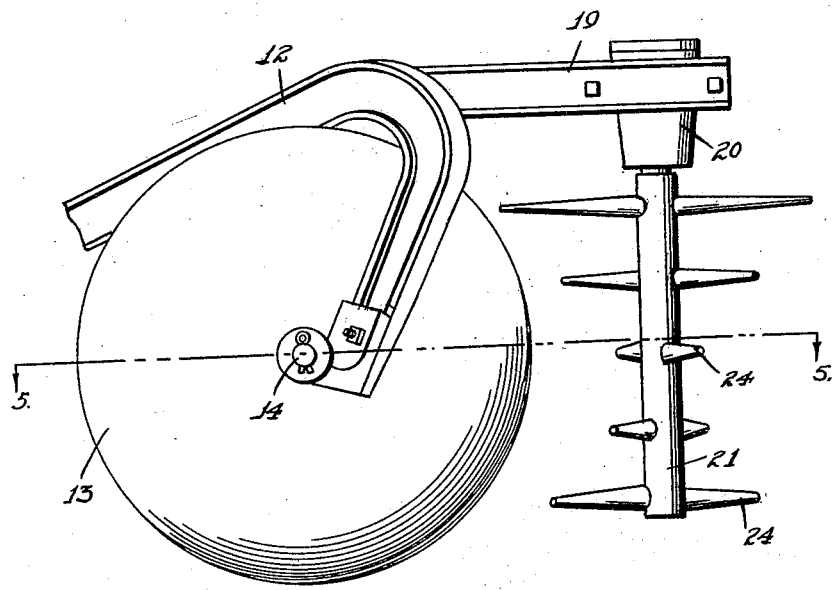
Figure 4 shows a detail view with the parts tilted from normal working position to a position showing the full circular outline of the disk, and also showing the rotary tiller shaft in a vertical position for the purpose of illustrating the relative positions of the ends of the tiller blades and the adjacent edge of the disk.
Figure 3:
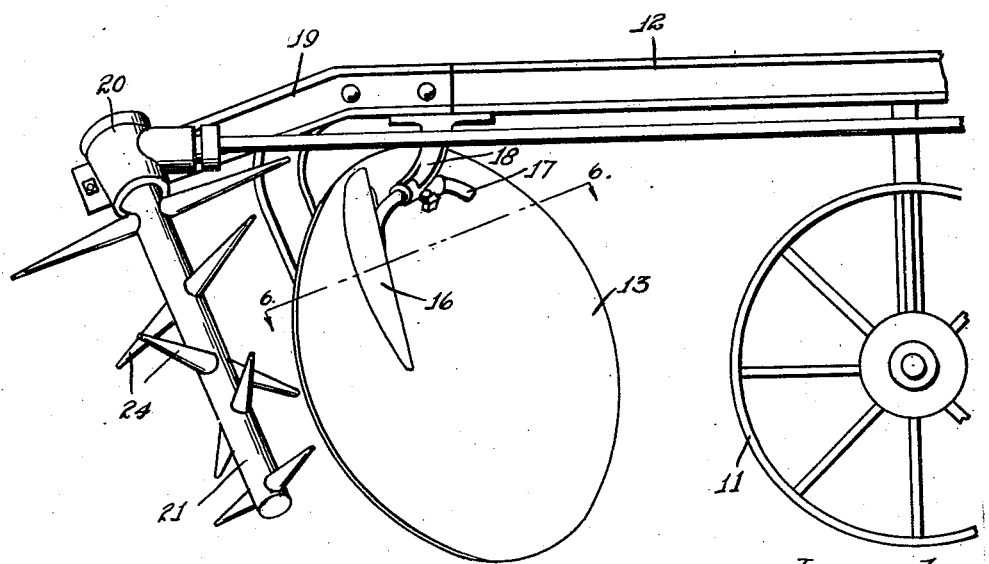
Figure 3 shows a side elevation of same.

Referring to the accompanying drawings, I have used the reference numeral 10 to indicate generally the plow frame, and 11 its supporting wheels. 12 is the plow beam, and rotatively mounted upon the plow beam is the disk plow 13 having a shaft 14 mounted in the bearing 15 on the beam 12. The working face has the degree of concavity now commonly employed, and the disk is extended from the plow beam at the same degree of angularity as is now commonly employed in disk plows of this character. I also employ the usual scraper blade 16, but have provided for it a curved stem 17 mounted in a bracket 18 fixed to a plow beam. These parts are so arranged that the position of the scraper may be adjusted relative to the disk, so that the scraper blade will have more or less frictional engagement with the furrow slice or may be moved to position where it will be out of frictional engagement with the furrow slice, and in all of these positions the scraper blade will perform its function of preventing the accumulation of soil upon the working face of the disk.

It will be noted from the drawings that I do not employ any stationary mould board adjacent to the working face of the disk, for the purpose of completing the turning-over movement of the furrow slice, because that is unnecessary when the disk plow is used in connection with my improved tiller.

My improved tiller device comprises a bracket 19 which may be connected to the plow beam, and which supports a tiller shaft housing 20. This housing receives a tiller shaft 21 and has bearings in the housing, and at one side of the housing there is a power shaft housing 22 which receives the power shaft 23, the forward end of which is connected to the power-take-off device of the tractor which draws the plow, or it may be rotated by an independent motor.

The tiller shaft has formed on or fixed to its body portion a series of tiller blades 24, which project outwardly at right angles to the shaft. These tiller blades are preferably staggered with relation to each other, as clearly shown in the drawings, and the lower end of the shaft is supported in position where it projects downwardly and forwardly, and laterally, as clearly illustrated in the drawings, and the shaft is so positioned with relation to the adjacent edge of the disk that the various tiller blades, during their rotary movement, will closely approach the adjacent edge of the disk. In Figure 4 I have shown by dotted lines at 25 the positions that some of these blades will assume when they are in their position of movement closest to the edge of the disk.

Figure 5:
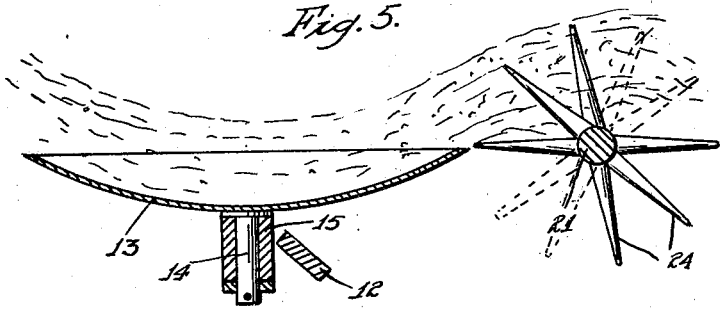
Figure 5 shows a detail sectional view taken on the line 5—5 of Figure 4, and illustrating by dotted lines the outlines of a furrow slice passing across the face of the disk and into the field of operation of the tiller.
Figure 6:
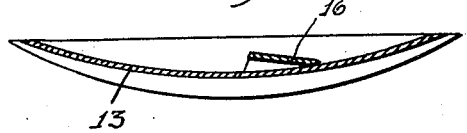
Figure 6 shows a transverse sectional view on the line 6—6 of Figure 3.
Figure 7:
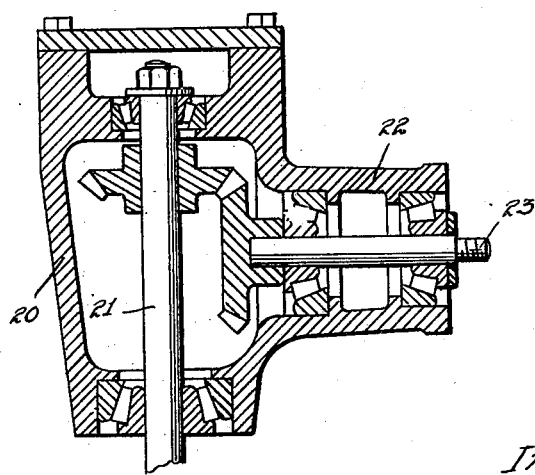
Figure 7 shows a detail sectional view illustrating the housing and frame member for the upper end of the tiller shaft.

In practical use, and assuming that the disk plow is being advanced by a tractor in the ordinary manner, and that the pulverizer is being rotated rapidly in the direction shown by the arrows in Figure 5, through a power-take-off attachment of the tractor connected to the power shaft 23, then the disk will enter the soil and cut from it a furrow slice, which furrow slice will be moved rearwardly and laterally, and one edge of it will be tilted upwardly by the normal action of the disk plow. When this furrow slice passes beyond the rear edge of the disk, it will be engaged by the tiller blades, which are being rotated at high speed, approximately five hundred revolutions a minute, and these blades will complete the turning-over movement of the furrow slice to the extent at least that the "trash" will be thoroughly covered, and at the same time these tiller blades will thoroughly pulverize the soil and deposit it upon the field in condition forming an ideal seed bed.

One of the important advantages gained by the use of my improvement is that with a tractor of given power a certain number or size of disk plows may be advanced through the soil at a given speed, but will do only the plowing part of the work, leaving the disking and harrowing for subsequent operations; whereas with my improvement I can with the same engine and the same number or size of disks complete not only the plowing operation, but also the soil pulverizing operations and prepare an ideal seed bed in one operation; and the reason why with my improvement the same area can be covered as with the ordinary disk plow in the same time is that first I have dispensed with the stationary mould board usually required in disk plows. This stationary mould board must be so shaped that it will engage the furrow slice and change its direction necessary for forming a turning-over movement, and this causes a great amount of friction, which is wholly eliminated by the use of my rotary tiller. Then also my rotary tiller is so positioned relative to the furrow slice as it is delivered from the disk that the propeller blades strike upon the furrow slice when they are moving to some extent rearwardly relative to the adjacent portion of the furrow slice. Hence, to a certain extent, the tiller blades tend to act upon the furrow slice as tractor wheels and tend to advance the plow, with the net result that with my improvement applied to a plow I can plow and pulverize as great an area in a given time as can be plowed only with the ordinary disk plow using the same amount of applied power.

Under certain conditions of the soil I find that the scraper 16 is not necessary, so far as it aids in "scouring" the working face of the disk, and that under such conditions I can move it circumferentially of the disk away from the furrow slice to a position where it will not have frictional contact with the furrow slice proper, but will be in position to perform its function of scouring and when that is done additional frictional losses are eliminated.

In describing the action of plows it is the general practice to refer to the travel of the furrow slice across the plow, and for convenience and clearness I have herein followed this custom, although I recognize that it is the plow which travels relative to the furrow slice.

I claim as my invention:

1. The combination of a plow frame, a rotatable disk carried by the plow frame having a concave working face and being presented at such angle that when being advanced it will cut a furrow slice, move it rearwardly and outwardly and perform the initial part only of the turning-over movement of the furrow slice, a rotary tiller device comprising a shaft having its upper end rotatably supported on the plow frame, a series of tiller blades fixed to the shaft and extended substantially at right angles thereto, said shaft being positioned in the rear of the disk and being extended substantially parallel with the under surface of the furrow slice as it passes from the adjacent edge of the disk with the shaft out of the path of travel of the furrow slice and the tiller blades in position to engage and penetrate the furrow slice during its rotation, completing its turning-over movement and pulverizing it and throwing it rearwardly and outwardly.

2. The combination of a plow frame, a rotatable disk carried by the plow frame having a concave working face and being presented at such angle that when being advanced it will cut a furrow slice, move it rearwardly and outwardly and perform the initial part only of the turning-over movement of the furrow slice, a rotary tiller device comprising a shaft having its upper end rotatably supported on the plow frame, a series of tiller blades fixed to the shaft and extended substantially at right angles thereto, said shaft being positioned in the rear of the disk and being extended substantially parallel with the under surface of the furrow slice as it passes from the adjacent edge of the disk with the shaft out of the path of travel of the furrow slice and the tiller blades in position to engage and penetrate the furrow slice during its rotation, completing its turning-over movement and pulverizing it and throwing it rearwardly and outwardly, said tiller blades being of varying lengths so that each may extend close to, but not touch, the edge of the disk.

3. The combination of a plow frame, a disk carried by the plow frame and having a concave working surface and supported at such an angle relative to the frame that when being advanced it will cut a furrow slice and cause same to move relative to the disk rearwardly and laterally and to complete a part only of the turning-over movement of the furrow slice, a rotary tiller device comprising a shaft and a series of tiller blades fixed to it, said tiller device being rotatably supported at its upper end upon the plow frame and being extended downwardly, forwardly and outwardly in the rear of the disk and in position where the disk will shield the tiller shaft from direct contact with the furrow slice and the blades will engage the under surface of the furrow slice and complete its turning-over movement, thoroughly pulverizing it and throw it outwardly and rearwardly relative to its path of travel when passing from the disk, said tiller blades being of varying lengths so that each will extend to approximately the same distance from the adjacent edge of the disk, and means for applying power to the shaft for rotating it at high speed.

4. The combination of a disk plow and a rotary tiller device, comprising a shaft and tiller blades fixed to the shaft, means for rotatively supporting the shaft at its upper end on the plow frame, and means for rotating the shaft, said shaft being inclined downwardly, forwardly and outwardly in position where it is shielded by the disk from direct engagement with the furrow slice, and in position where the tiller blades will engage the furrow slice after leaving the disk, complete its turning-over movement, pulverize it and throw it outwardly and rearwardly.

Des Moines, Iowa, January 26, 1928.
GUY HERRING HALL.